United States Patent
Tyson

(10) Patent No.: US 6,590,350 B1
(45) Date of Patent: Jul. 8, 2003

(54) LIGHTING SYSTEM WITH A HIGH INTENSITY DISCHARGE LAMP

(75) Inventor: Lawrence Samuel Tyson, Sutton (GB)

(73) Assignee: Microlights Limited, Wilshire (GB)

( * ) Notice: Subject to any disclaimer, the term of this patent is extended or adjusted under 35 U.S.C. 154(b) by 0 days.

(21) Appl. No.: 09/831,601

(22) PCT Filed: Nov. 18, 1999

(86) PCT No.: PCT/GB99/03847

§ 371 (c)(1), (2), (4) Date: Jul. 9, 2001

(87) PCT Pub. No.: WO00/30412

PCT Pub. Date: May 25, 2000

(30) Foreign Application Priority Data

Nov. 18, 1998 (GB) .............................. 9825296

(51) Int. Cl.$^7$ ............................... H05B 37/02
(52) U.S. Cl. ................ 315/291; 315/307; 315/224
(58) Field of Search ............... 315/291, 307, 315/DIG. 7, 224, 225, 243, 241 R, 58, 59, 246; 313/317, 318.01, 318.08

(56) References Cited

U.S. PATENT DOCUMENTS

| 4,060,752 | A | * | 11/1977 | Walker ....................... 315/224 |
| 4,134,042 | A |  | 1/1979 | van Heemskerck Veeckens ..................... 315/59 |
| 5,289,083 | A | * | 2/1994 | Quazi .......................... 315/224 |
| 5,436,533 | A | * | 7/1995 | Fromm et al. .......... 315/209 R |
| 5,742,132 | A | * | 4/1998 | Huber et al. ............ 315/209 R |
| 5,889,360 | A | * | 3/1999 | Frey et al. ............. 313/318.01 |
| 6,356,037 | B1 | * | 3/2002 | Sano et al. ............. 315/241 R |

FOREIGN PATENT DOCUMENTS

| DE | 19505476 | 8/1996 |
| DE | 19530485 | 2/1997 |
| DE | 19713935 | 10/1997 |
| EP | 0565113 | 10/1993 |
| GB | 2226463 | 6/1990 |
| WO | 9743875 | 11/1997 |
| WO | 9825441 | 6/1998 |

* cited by examiner

Primary Examiner—Don Wong
Assistant Examiner—Ephrem Alemu
(74) Attorney, Agent, or Firm—Merchant & Gould, P.C.

(57) ABSTRACT

A lighting system (1) having a high intensity discharge lamp (16) mounted replaceably in a holder (25) which connects to an electronic control (8) which includes a variable frequency generator (10), a joint operating circuit extends from the lamp to the control; the control is arranged to sweep over a predetermined range of frequencies to produce by means of a resonant circuit which includes in the circuit (22) capacitance (12, 13, 21) which is at least partly in or on the lamp. Removal of the lamp from the system prevents the production of the resonant high voltage ensuring improved safety.

13 Claims, 7 Drawing Sheets

LIGHTING SYSTEM WITH A HIGH INTENSITY DISCHARGE LAMP

TECHNICAL FIELD

The present invention relates to lighting systems including high intensity discharge lamps and electrical controls therefor.

BACKGROUND

High intensity discharge lamps in this specification are characterised in that they have a short arc length contained within an envelope, the envelope being filled with fill materials that may not be fully evaporated and hence have a low pressure when the lamp is cold and before the lamp has started conducting and when the lamp is operating and is hot, the said fill materials have a high pressure. High intensity discharge lamps are further characterised in that as a result of this increase in pressure of the fill material an ignition voltage required to start such lamps may increase sharply as the lamp becomes hot. For example a lamp with a cold ignition voltage of 2,000 volts may when hot require an ignition voltage of 30,000 volts to restart the lamp. High intensity discharge lamps frequently suffer from acoustic resonance, a phenomen whereby a frequency of the supply voltage excites a standing pressure wave within the lamp envelope.

Such electrical high intensity discharge lamps are constructed with a sealed envelope containing at least two electrodes for an electrical discharge, and are arranged to be used for lighting when an arc is established across the electrodes.

Such lamps have a high impedance before they are lit, and a low impedance while they are lit.

This characteristic means that in order to use such lamps in lighting systems it is necessary to combine the lamp with electrical controls matched to the lamp characteristic. Historically, the controls comprise a wound choke or ballast, which produces a back emf, which limits the current flow through the lamp while it is lit. To enable the lamp to become lit a starter is provided which produces a very high voltage across the lamp, which is normally sufficient to break down the resistance of the lamp and cause it to enter a conductive state. If a light fails to start on the first attempt, the starter will provide a further high voltage pulse across the lamp. This process continues until the lamp lights or the electrical power is removed from the circuit. It is this process that gives rise to the characteristic flicker of a discharge lamp that has failed to start when pulsed.

Although wound chokes are reliable, it is more energy efficient to provide controls comprising an electronic ballast. These electronic ballasts limit the current by generating a high frequency wave form which may provide for an intermittent power supply to the lamp.

As with a wound choke, when the controls comprise an electronic ballast to limit the current flowing through the lamp when it is lit, it is necessary to provide means for starting the lamp. While when a wound choke is used the starter can generate a high voltage by interrupting the current flow through the choke, there is insufficient stored energy in an electronic ballast to utilise it in this way. Hence it is necessary to incorporate means specifically to generate the high voltage required for starting the lamp. Known means to generate high voltage includes resonant circuits and suddenly discharged capacitor circuits. Known electronic controls having a self oscillating circuit operate at a frequency determined by the resonance of power handling components in the control circuit. A benefit of these self oscillating circuits is simplicity and low cost, however a disadvantage is that it is difficult to vary the operating frequency of such a control circuit as the operating frequency is determined solely by the values of fixed components, the values of which are determined by the power the circuit is arranged to control. Also known are electronic controls where the operating frequency is determined solely by a frequency generator such that the operating frequency can be arranged to be independent of the characteristics of power handling components in the circuit.

An oscillating control circuit where the frequency is determined by the characteristics of the power handling components is described in U.S. Pat. No. 5,341,067 to Nilssen. FIG. 1 of Nilssen's Patent shows that the oscillation of the circuit depends on the characteristics of the capacitor 52, the inductor 51, and the saturable inductors 47 and 49. To prevent the destruction of the control circuit, Nilssen arranges for the capacitor 52 to be removed from the circuit with the lamp 26. Such removal of the capacitor interrupts the resonant circuit important to self-oscillation, and as a consequence the oscillation stops completely. Nilssen's circuit is arranged to control and power a low pressure discharge lamp, such as fluorescent lamp, and would not be readily adaptable to operate a high intensity discharge lamp because of the very different starting and running requirements of high intensity discharge lamps, which require higher ignition voltages and operate with higher arc currents. Additionally the acoustic resonance phenomena exhibited by high intensity discharge lamps precludes operation in the frequency range specified by Nilssen.

UK Patent Application No. GB 2,226,463 to Yazdanian shows a high frequency electronic control utilising a frequency generator for use with a fluorescent lamp. Yazdanian discloses on page 9 to 11 the use of a series resonant circuit for lamp ignition, whereby there is a starting sequence in which the frequency sweeps from a frequency above the resonant frequency, through the resonant frequency to a lower frequency which is held for a dwell period, after which the frequency is increased again. Yazdanian states, on page 10 line 5, that a benefit of this is to assure that striking does take place for a variety of fluorescent lights irrespective of tolerances in the lamps and the control. This application does not disclose or teach the use of a limited frequency range as a means of discriminating between lamp power ratings.

A high intensity discharge lamp including a temperature dependent capacitor connected in series or in parallel with the lamp is shown in U.S. Pat. No. 4,134,042 to Philips. The Philips' Patent describes in column 3, beginning at line 45, how on starting the lamp, an initial high impedance of the capacitor ensures the lamp rapidly reaches its operating condition, when the heat generated within the lamp heats the capacitor causing its capacitance value to decrease (and hence its impedance increases) causing a reduced current to flow through the lamp. As a result the lamp warms up quickly, but once hot is not over-powered. Philips does not teach the use of a thermally coupled capacitor to modulate the ignition of a lamp.

Once started discharge lamps generate heat and as a result discharge lamps can be more difficult to start after a period of use when the lamp is hot, than they are when they are first started from cold.

Since the controls tend to have a longer life than the lamp it is normal to incorporate the controls into a lighting system and to have the lamp easily replaceable. The lamp is normally provided with male contacts which when it is fitted in the lighting system make electrical connection with the electrical supply through female contacts in a lampholder. A hazard with the female contacts in the lampholder is that when the lamp is removed the controls will detect a very high impedance across the contacts, which will be similar to the condition which pertains before the lamp is lit. Hence the controls will try to start a lamp, by producing the necessary high voltages across the contacts in the lampholder. This means that the hazard from the exposed contacts is increased, since the supply voltage will typically be 240 v or 100 v, but the voltage produced by the starter circuit will be in the order of several thousand volts. Hence the hazard from accidental personal contact with the terminals is greatly increased by the starter. A further hazard arising from cost and space considerations means that the insulating parts in an electrical circuit comprising the controls, the lamp holder, lead wires interconnecting these parts and any intermediate connectors are frequently only rated for continuous use at the supply voltage. The nature of the insulating parts is such that the insulating parts can also withstand safely the much higher voltages that occur during starting, but only for a very short period. Hence when a lamp fails to start, or is absent from the lampholder, and the controls repeatedly try to start the lamp, it is known for the insulating parts to break down and conduct electricity. This has been identified as a cause of fire. Similarly the controls may incorporate control parts which have a limited ability to withstand the much higher voltages. Such control parts will be damaged if a lamp fails to start or is absent from the lampholder, and the controls repeatedly try to start the lamp.

To gain economy of scale, one size lampholder may accommodate several alternative power ratings of lamps. The lighting system manufacturer attaches a label to the lighting system informing a user of the correct lamp power rating to match the output of the controls and the heat dissipation capability of the lighting system. A problem arises when a user inserts a lamp of the incorrect power rating. There is a high risk that the lamp will overheat and explode with an attendant risk of personal injury and or damage to the lighting system and the controls. To overcome this problem some manufacturers have tried to prevent the accidental insertion of an incorrectly rated lamp in a lampholder for example by sizing the lampholder pins differently for different power ratings. A known example of preventing the insertion of a low power rated lamp into a socket intended to receive a higher power rated lamp, is that adopted by Philips with their MSR-HR lamp range, which consisted of three lamp powers, a 125 Watt, a 200 Watt and a 400 Watt. The 125 W lamp is provided with two large diameter pins to mount to a lampholder, while the 250 W lamp is provided with one small and one large diameter pin, and the 400 W lamp is provided with two small diameter pins, each pair of pins having the same pitch. Hence, it is possible incorrectly to insert a higher rated lamp into a socket intended to receive a lower rated lamp, but it is not possible to insert a lower rated lamp into a socket intended to receive a higher rated lamp. Hence a risk of explosive lamp failure is avoided. The disadvantage of this for the lighting system manufacturer is increased costs due to having to manufacture and stock a large range of lampholders.

A further problem for manufacturers of lighting systems is that any electrical interconnections forming an electrical circuit between the control and the lamp may have an interconnection reactance. Where an electronic ballast has a resonant circuit for starting the lamp, such an interconnection reactance may prevent the resonant circuit becoming properly resonant. Hence the lamp will not start satisfactorily. This problem can be alleviated by ensuring that such interconnection reactance is minimised. To minimise the interconnection reactance it is necessary to locate the control physically close to the lamp; this restricts the design of large lighting systems.

SUMMARY

According to the invention there is provided a lighting system comprising at least:

(a) a high intensity discharge lamp, the high intensity discharge lamp comprising a sealed envelope containing at least two electrodes for an electrical discharge, (b) a holder for the lamp arranged so that the lamp can be replaced (c) an electronic control means for operating the lamp, (d) a joint operating circuit included in and between the control means and the lamp, (e) the control means having a variable frequency generator, the control means being so arranged to sweep over a pre-determined range of frequencies to produce by means of a resonant circuit a specific high frequency high voltage output for application to the joint operating circuit to ignite the lamp, (f) the resonant circuit comprising at least an inductance in the control means and a capacitance in the joint operating circuit, (g) said capacitance connected in parallel with a current path through the lamp, (h) said capacitance mounted at least partly to the lamp.

In our co-pending patent application no PCT/GB99/038354 filed on the same date, we disclose a lighting system in which an adaptor and specifically appropriate circuitry is provided to ensure lamp type flexibility and a degree of safety. In the present invention the degree of safety has been enhanced by ensuring the system according to the preferred embodiment will only operate with a particular type of lamp.

Preferably the control is arranged so that when the joint operating circuit is in a resonant condition a high resonant voltage is generated. The high resonant voltage is arranged to be applied across the lamp. A value of the high resonant voltage is dependent on the type and size of the lamp that is to be started. For example the high resonant voltage would generally be between 500 volts and 50,000 volts.

A benefit of mounting the lamp capacitance in thermal proximity to the lamp is that a capacitance temperature will change so as to follow a change in a lamp temperature.

In an embodiment of the invention the lamp capacitance is mounted within a part of the envelope. In a preferred arrangement the envelope has at least two sealed compartments, a first compartment containing the discharge lamp elements, and a second compartment containing the lamp capacitance.

In an alternative embodiment of the invention the envelope is mounted to a cap, and the lamp capacitance is mounted within the cap.

Preferably the lamp capacitance has a temperature dependant coefficient of impedance. In an embodiment of the invention, the temperature dependant coefficient of impedance is negative. In an alternative embodiment of the invention the temperature dependant coefficient of impedance is positive.

The lamp may further comprise electrical supply connection means and the lamp capacitance is electrically connected across the electrical supply connection means and in a parallel current path to the lamp when the lamp is conductive.

A benefit of having the lamp capacitance in parallel with the lamp is that before the lamp is lit, when it has a high resistance and is effectively open circuit, the joint operating circuit includes the lamp capacitance. However once the lamp is lit, the resistance of the lamp is low, and the lamp effectively short circuits the lamp capacitance so that the joint control circuit then no longer effectively includes the lamp capacitance as an active part, and hence the joint operating circuit will not be resonant at the particular frequency.

If a capacitor providing the lamp capacitance is chosen so that the capacitor has a temperature dependant coefficient of capacitance, then the lamp capacitance will change with a change in the temperature of the lamp. Hence if the lamp capacitance has a negative temperature dependant coefficient of impedance, the value of impedance will fall with an increase in temperature arising from normal operation of the lamp. By careful selection of the value of capacitance and the temperature dependant coefficient of capacitance, the joint control circuit can be prevented from being resonant at the particular frequency when the lamp is hot. A benefit of this is that a non-resonant joint control circuit can not generate the high resonant voltage, and hence the circuit avoids unnecessary electrical stress on any component associated with a lamp supply circuit. This increases reliability and overall life of the lighting system.

A benefit of having such values for the lamp capacitance and the control reactance is that a reactance of interconnections between the control and the lamp may not prevent the joint control circuit from being resonant at substantially the particular frequency. The reactance of interconnections may be capacitive.

Preferably the value of impedance of the lamp capacitance is no less than one hundredth of the value of the impedance of the control reactance and no more than a hundred times the value of the impedance of the control reactance. More preferably the value of impedance of the lamp capacitance is no less than a tenth of the value of the impedance of the control reactance and no more than ten times the value of the impedance of the control reactance.

Preferably the value of impedance of the lamp capacitance is small in comparison with the capacitance of interconnections. Preferably where the capacitance of interconnections is predominantly capacitive, the impedance of the interconnection reactance is at least twice the impedance of the lamp capacitance and preferably the impedance of the lamp capacitance is at most four times the total impedance of the joint control circuit.

It will be noted that where an impedance of a reactance is measured, the impedance will change with frequency, and in this specification such frequency is substantially a resonant frequency of a joint control circuit that is arranged for the generation of high voltages for starting of a lamp.

Preferably the control is arranged to have at least two modes of operation, where the selection of the mode of operation of the control is dependent on the value of impedance of the lamp capacitance of the lamp fitted to the lighting system.

A benefit of the control having two modes of operation which are dependant on the value of impedance of the lamp capacitance of the lamp fitted to the lighting system is that where the value of impedance is affected by temperature, the mode of operation of the control will be dependant on the temperature of the lamp. Hence the control may be inhibited from operating in a first mode when the lamp is hot.

A further benefit is that when a lamp is absent from the lighting system, a value of impedance measured across the electrical supply connection means will be high as there is an open circuit across the electrical supply connection means, and hence the control may also be inhibited from operating in a first mode when the lamp is absent from the lighting system.

The control also comprises a variable frequency generator which may be arranged to operate sequentially so that at a cycle start time a start frequency is selected, and the frequency generator may over a sweep time period cause the frequency to fall to a dwell frequency which may then be held for a dwell time period and then increased to a sustained frequency which may be sustained for as long as the lamp continues to be lit.

Preferably the variable frequency generator is arranged so that the start frequency is higher than the dwell frequency, and preferably also higher than the sustained frequency. Preferably the variable frequency generator is also arranged so that the start frequency is above the particular frequency, and the dwell frequency is below the particular frequency.

In an embodiment of the invention, the variable frequency generator is arranged so that the sweep time period is preferably less than 250 ms (milli-seconds) and more preferably the sweep time period is less than 10 ms.

An advantage of a small value for the sweep time period is that the heating effect of any energy dissipated in the control is minimised so that cheaper components may be used in the manufacture of the control.

The dwell time period may be considerably longer than the sweep time period.

In an embodiment of the invention, the control is in a non-resonant mode of operation at the start frequency, and at the dwell frequency, and at the sustained frequency. Preferably a resonant mode occurs during the sweep time period as the frequency is falling. An effect of the resonant mode is to cause a high voltage to occur across the lamp. Preferably the high voltage is sufficient to cause the lamp to light.

A benefit of the dwell time period is that the lamp is given adequate time for the discharge to stabilise.

The variable frequency generator preferably is arranged so that the sustained frequency is preferably higher than the dwell frequency and more preferably within a stable operating frequency range of the lamp.

Preferably the resonant mode occurs within a stable operating frequency range of the lamp.

Preferably the control has control means for limiting the electrical current flowing through the lamp, so as to operate the lamp at its correct power rating.

According to a further aspect of the invention there is provided a lamp comprising a lamp capacitance mounted in thermal proximity to the lamp.

The above preferred embodiments of the one aspect of the invention are generally applicable to the further aspect of the invention.

DESCRIPTION OF THE DRAWINGS

Specific embodiments of the invention will now be described by way of example with reference to the accompanying drawings in which.

DETAILED DESCRIPTION

Figure 3:
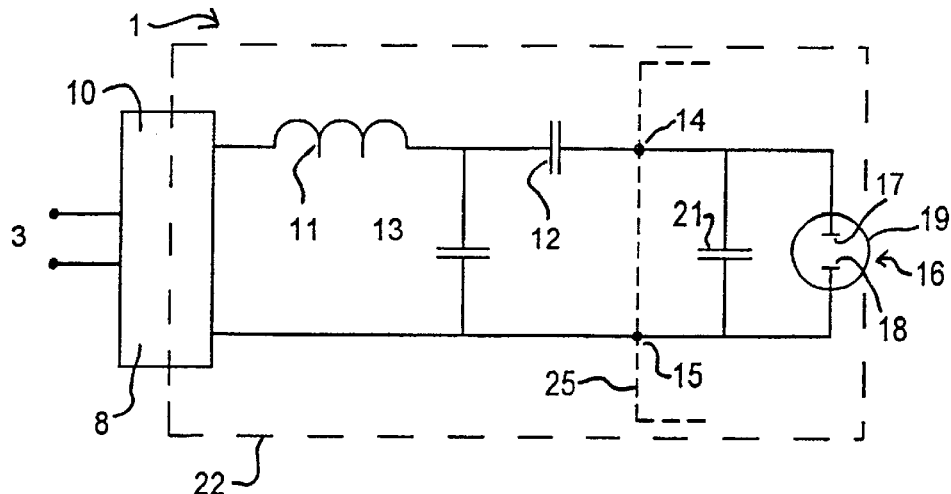
FIG. 3 is a circuit diagram of a first embodiment of lighting system, lamp, control and joint control circuit according to the present invention.

In the embodiment shown in FIG. 3 a lighting system 1 has a control means 8 which comprises a variable frequency generator 10, which is connected to an electrical supply 3. The generator 10 has negligible internal impedance, produces a square wave voltage output of amplitude 350 volts, and has an output variable over a wide range of frequencies. The wide range of frequencies is preferably from 400–1,500 kHz, although it is more preferable to limit the frequencies to a narrower predetermined range. A suitable predetermined range would be +10% to −10% of a nominal frequency of 500 kHz. A high intensity discharge lamp 16 is coupled to the generator via an inductor 11, and a capacitor 12 at disconnection points 14 and 15. Lamp 16 comprises a sealed envelope 19 containing electrodes 17 and 18 arranged for an electrical discharge when the lamp is lit. An ignition capacitor 13 is provided. A second ignition capacitor is provided as a lamp capacitor 21, which is mounted to the lamp. A holder 25 has electrical connections 14 and 15 and is arranged to replaceably receive the lamp 16 and provide means for electrically connecting the lamp into the lighting system. A joint operating circuit 22 is included in and between the generator 10, the inductor 11, the capacitors 12 13 and 21, the holder 25 with its electrical connections 14 and 15, and the lamp 16. The control means is arranged so that the variable frequency generator produces an output with a frequency sweep over the predetermined frequency range such that a resonant circuit formed by inductance 11 and the capacitors 12, 13 and 21 produces a resonant high voltage to ignite the lamp.

Figure 5:
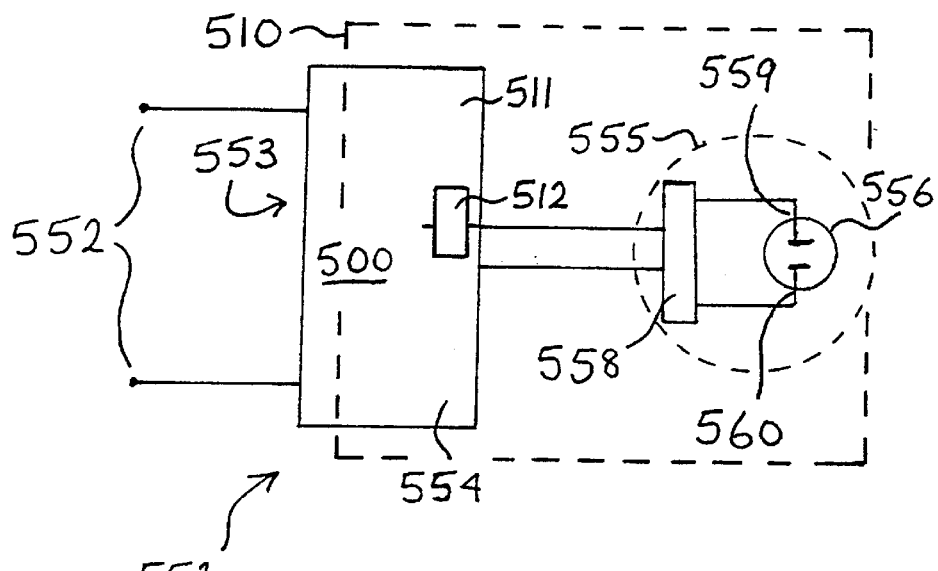
FIG. 5 is a block circuit diagram of a third embodiment of lighting system, lamp, control and joint control circuit according to the present invention.

FIG. 5 shows a lighting system 551 according to a third embodiment. The system 551 has an input 552, a control 553, and a lamp 555 in which is a lamp capacitance 558. A joint control circuit 510 is included in and between the control means and the lamp. The lamp 555 has an envelope 556 containing at least two electrodes for an electrical discharge. The control 553 has a control reactance 554 and a variable frequency generator 500. The lamp capacitance 558 may contain all of the ignition capacitance of the joint control circuit as shown in the Table 1 below. The control reactance 554 has an inductance 511 and a capacitance 512 both in series with a current path through the lamp.

In use, system 551 is started and operated in a similar manner to system 1. The control is arranged to provide a stimulating supply to the joint control circuit at the particular frequency. When the joint control circuit is resonant, a high voltage is generated across lamp terminals 559 and 560, which causes the lamp to operate. When the lamp is lit, a resistance of the lamp measured across terminals 559 and 560 is low, and hence the lamp capacitance 558 is effectively shorted out of the circuit.

Table 1 below shows by way of example values of the inductor 11 capacitor 12 and lamp capacitor 21 which have been chosen to suit the power of the lamp used, which for these examples, is 70 watts and 150 watts.

TABLE 1

| FIG. 3 150 Watt Lamp | | FIG. 3 70 Watt Lamp | | FIG. 5 150 Watt Lamp | | FIG. 5 70 Watt Lamp | |
|---|---|---|---|---|---|---|---|
| Inductor 11 | 41 µH | Inductor 11 | 76 µH | Inductor 511 | 76 µH | Inductor 511 | 76 µH |
| Capacitor 12 | 11 nF | Capacitor 12 | 11 nF | Capacitor 512 | 11 nF | Capacitor 512 | 11 nF |
| Capacitor 13 | 1.6 nF | Capacitor 13 | .75 n | Capacitor 558 | 1.6 nF | Capacitor 558 | 3.2 nF |
| Capacitor 21 | 1.6 nF | Capacitor 21 | .75 n | | | | |

Although the inductance 11 and ignition capacitor 13 in FIG. 3 is shown as discrete components, in a practical embodiment where the lamp is mounted remotely from the control 8 and the generator 10, a reactance of the interconnections between the lamp and the control and generator may be significant. The values of the inductance 11 and the capacitance 13 may be chosen to compensate for this reactance of interconnections. Examples where such a reactance of interconnections in the joint control circuit may occur is in street lighting where the controls may be placed at ground level, and the lamp at a high level, and in display lighting where the mounting of bulky controls adjacent to lamps would be unacceptable.

Figure 4:
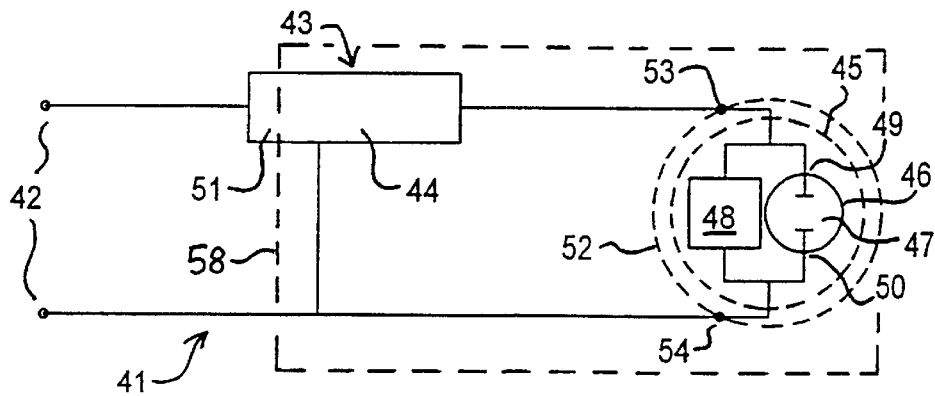
FIG. 4 is a circuit diagram of a second embodiment of lighting system, lamp, control and joint control circuit according to the present invention.

In the second embodiment in FIG. 4 a lighting system 41 has input terminals 42, a control 43, and a lamp 45, mounted to a lampholder 52, the lamp comprising an envelope 46 containing lamp elements 47 and a lamp capacitance 48. The control 43 includes a variable frequency generator 51 and a control reactance 44. The lampholder 52 has two contacts 53 and 54 for making a disconnectable electrical connection to the lamp 45. A joint control circuit 58 is in and between the control 43 and the lamp 45.

In use, when the lighting system 41 is first switched on and an electrical supply is connected across terminals 42, the control 43 and the control reactance 44 and the lamp capacitance 48 form a joint control circuit which is arranged to resonate at a particular frequency. The control is arranged to provide a stimulating supply to the joint control circuit at the particular frequency. When the joint control circuit is resonant, a high voltage is generated across lamp terminals 49 and 50, which causes the lamp elements 47 to conduct electricity so that the lamp emits energy as light and heat. The lamp is said to be lit when conducting electricity and emitting light. When the lamp is lit, a resistance of the lamp measured across terminals 49 and 50 is low, and hence the lamp capacitance 48 is effectively shorted out of the circuit. The control is arranged to limit the energy dissipated by the lamp, by controlling the flow of electricity through the lamp so that while the control circuit is resonant and the lamp is being lit, the high voltage is only applied for a very short time period, and when the lamp is lit the flow of electricity is limited so that the lamp is operated at a designed power level that may be sustained for a long period of continuous operation. The designed power level will be arrived at by a designer of the lighting system and a designer of the lamp and a designer of the control through consideration of the materials used and a maximum safe heat dissipation and with regard to optimising the life of each of the lighting system, the lamp and the control respectively.

The electrical supply connected across the supply terminals in FIGS. 3, 4 and 5 may be an alternating current or a direct current supply. The lamps 16, 45 and 555 may be suitably adapted commercially available high intensity discharge lamps such as a Philips MASTERCOLOUR CDM-T (Registered Trademark) or a GE ARCSTREAM (Registered Trademark).

Figure 6:
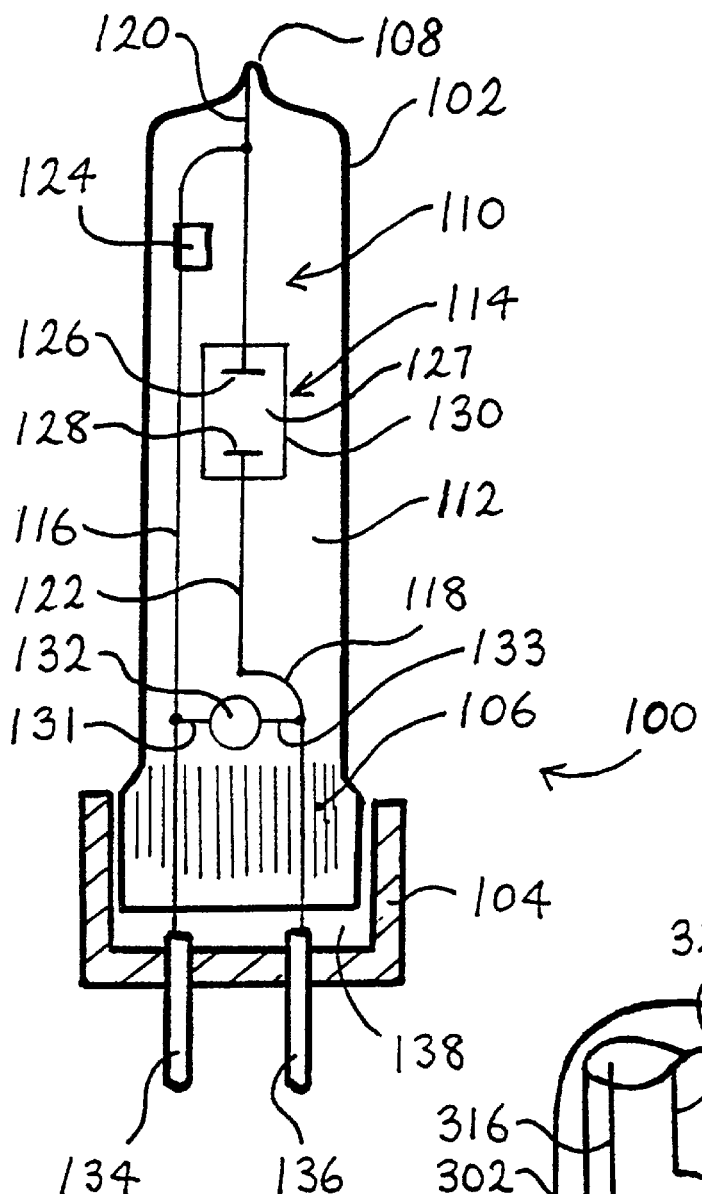
FIG. 6 is a partly sectioned side view of a lamp according to a first embodiment of the invention.

FIG. 6 shows a lamp 100 according to a further embodiment of the invention where the lamp comprises an envelope 102 which allows the transmission of visible light and may be made of a tubular section of a hard glass material. The lamp also comprises a lamp cap 104, which is shown sectioned to reveal a pinch region 106 of the envelope 104. The pinch region is formed by flattening the tubular envelope during manufacture of the lamp, while the envelope is sufficiently hot for the envelope to be permanently sealed at the pinch region 106. At the other end of the envelope 102, it has also be sealed at the twist region 108, so the envelope forms a sealed enclosure for lamp elements 110, comprising an inert gas 112, a burner 114, readout wires 116 and 118, support wires 120 and 122, and a getter 124. The burner 114 is supported by the support wire 120 and the support wire 122, which also make the electrical connections to the electrodes 126 and 128 which form end caps on the arc tube 130. Connected across the leadout wires 116 and 118 is a lamp capacitance 132. Leadout wires 116 and 118 are electrically connected to lamp pins 134 and 136 mounted in the lamp cap 104. The pinch region of the lamp is securely mounted to the lamp cap 104 by means of a heat resisting cement 138 which is also electrically insulating.

Figure 8:
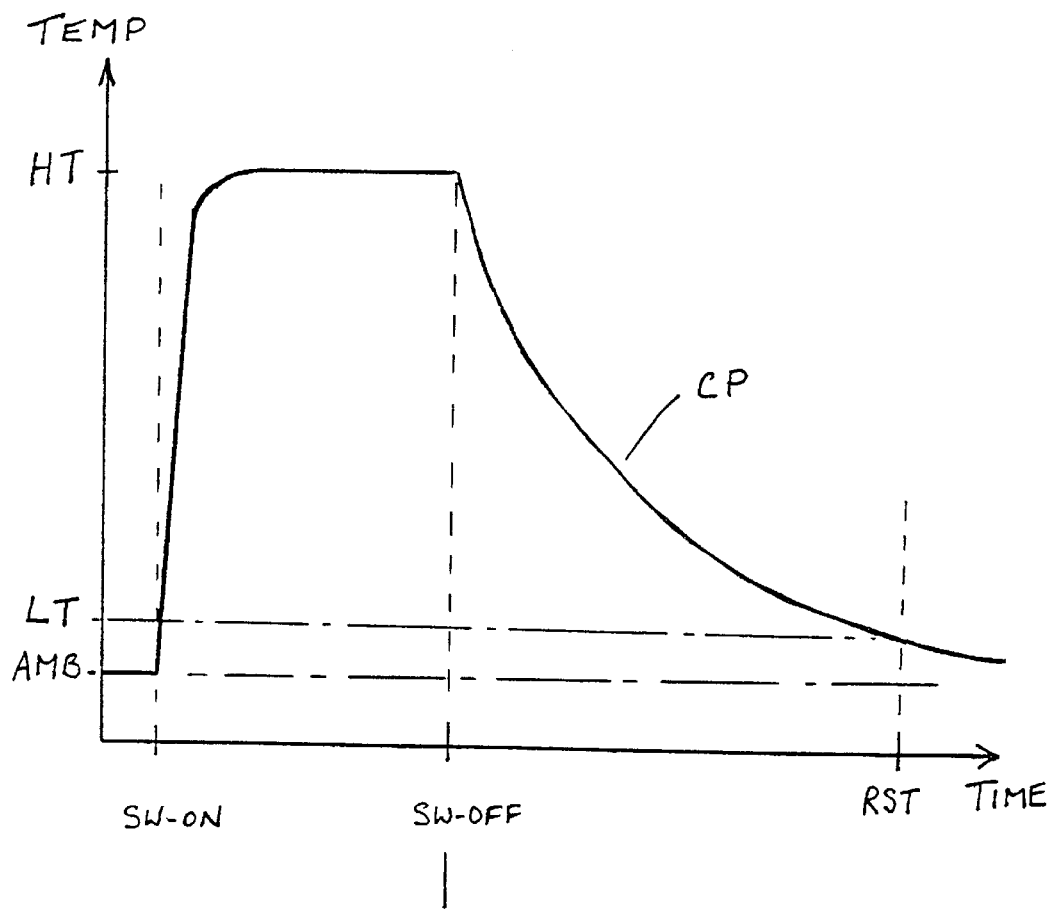
FIG. 8 is a graph of a variation in a lamp temperature over time.

In use the lamp 100 is mounted to a lamp holder such as that described in the first embodiment. An electrical supply according to a circuit such as that shown in FIGS. 3, 4 or 5 is electrically connected by means of contacts in the lamp holder to lamp pins 134 and 136 which are lamp terminals. When the lamp is being started the lamp capacitance 132 forms part of a joint control circuit together with a control reactance, which is separate from the lamp. The lamp when lit has a stable arc between the arc electrodes 126 and 128 and the arc is contained within the arc tube 130. The arc generates heat and light. The heat warms the getter 124, which is arranged to remove damaging impurities from within the lamp envelope 102. The heat also warms the lamp capacitance 132. Once the lamp is lit, the heat generated by the arc raises a lamp temperature rapidly to a high level. When the lamp is switched off and electrical power is removed from the lamp, it remains at a high temperature for a cooling period while heat is lost to the surroundings until it reaches a temperature substantially that of its surroundings. Exceptionally it is possible for the arc to become extinguished accidentally, either through a transient loss of electrical power that is sufficient for the arc to cease, or through other causes, although the electrical power remains connected to the lamp. The effect of the arc being extinguished is similar to the lamp being switched off in that the lamp remains at a substantially high temperature for a cooling period. The variation of temperature with time and the operation of the lamp is illustrated in FIG. 8, from which it can be seen that the vertical axis labelled "TEMP" shows the temperature within the lamp envelope 102, but outside of the burner 114, hereinafter called the lamp temperature, and the horizontal axis labelled "TIME" shows the elapsed time. The lamp temperature is at an ambient temperature AMB of the surroundings before electrical power is first applied to the lamp. When a suitable electrical supply is applied across the lamp terminals at a switch on time SW-ON the temperature rises rapidly to a high temperature HT that is maintained until the lamp is switched off at SW-OFF. The lamp then cools during a cooling period CP to a lower temperature LT. The lower temperature LT is a temperature at which the control is arranged to be able to re-start the lamp. A design of the control and lamp determines a value of the lower temperature LT. The lower temperature LT may be substantially at ambient temperature AMB, or at a temperature between the high temperature HT and ambient AMB.

It is inherent in many lamp designs that it is more difficult to start a hot lamp that is still at a high temperature after being recently switched off. Since the lamp capacitance is preferably mounted in thermal proximity to the lamp, a lamp capacitance temperature follows the lamp temperature. Hence a graph of lamp capacitance temperature with time for the same operations as shown in FIG. 8 would be similar to FIG. 8. Hence, where the lamp capacitance has a temperature dependant coefficient of capacitance, a value of an impedance of the lamp capacitance will vary with the lamp temperature. In an embodiment of the control this variation of the value of the impedance of the lamp capacitance may be arranged to prevent the control from attempting to restart the lamp until the lamp has reached the lower temperature LT shown in FIG. 8.

A further benefit of the embodiment shown in FIG. 6, is that a leaking of a fill 127 from the burner 114 into the enclosure of the envelope 102, may attack the capacitor 132 or its lead wires 131 & 133. The capacitor or the lead wires may be arranged so that such an attack would effectively remove the capacitor from the joint control circuit, preventing the joint control circuit from becoming resonant. Hence the control would be prevented from attempting to start a failed lamp.

In an alternative embodiment (not shown) similar to that shown in FIG. 6, the lamp capacitance 132 is mounted within the pinch region 106 of the lamp and not within the envelope 102 together with the lamp elements 110. A benefit of this alternative embodiment is that when the lamp capacitance 132 gets hot, any risk of it releasing contaminating gases into the enclosure of the envelope 102 is much reduced. This reduces a poisoning effect on the getter 124.

Figure 6A:
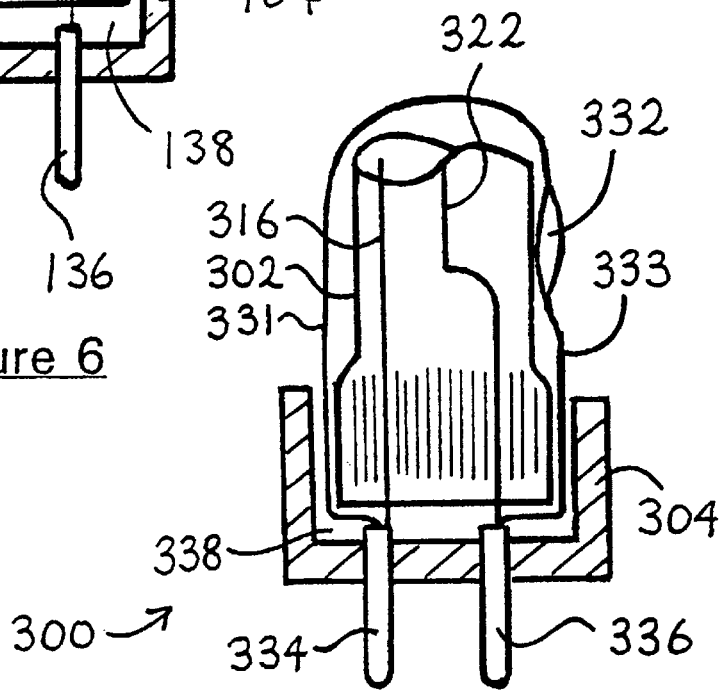
FIG. 6A is a partly sectioned side view of a lamp according to a second embodiment of the invention.

FIG. 6A shows a base part of a lamp 300 according to a yet further embodiment of the invention where the lamp comprises an envelope 302 which allows the transmission of visible light and may be made of a tubular section of a hard glass material. The lamp also comprises a pinch region 306 of the envelope 302. The parts of the second embodiment that are not shown in the FIG. 6A are similar to the first embodiment shown in FIG. 6. From FIG. 6A, leadout wires 316 and 318, a nd support wires 322 may be seen. Leadout wires 316 and 318 are electrically connected to lamp pins 334 and 336 mounted in a lamp cap 304 and the envelope 302 is securely mounted to the lamp cap 304 by means of a heat resisting cement 338 which is also electrically insulating. A lamp capacitance 332 is electrically connected to lamp pins 334 and 336 by lead wires 331 and 333. These lead wires may or may not be electrically insulated along their length. The lamp capacitance 332 is mounted so that it is in thermally proximity to the lamp envelope. Hence, in use when the lamp is lit, and heat is generated, a temperature of the lamp capacitance will increase. A gap 335 between the lamp capacitance and the lamp envelope 302, may be filled by a heat resisting cement or a heat resisting adhesive or a heat resisting filler. A benefit of filling the gap 335 is that a transfer of conducted heat from the lamp envelope to the lamp capacitance may be improved. A further benefit of this embodiment is that a lamp manufacturer may obtain benefits of this invention without having to make a large investment in production of a new arrangement of a lamp envelope.

Figure 7:
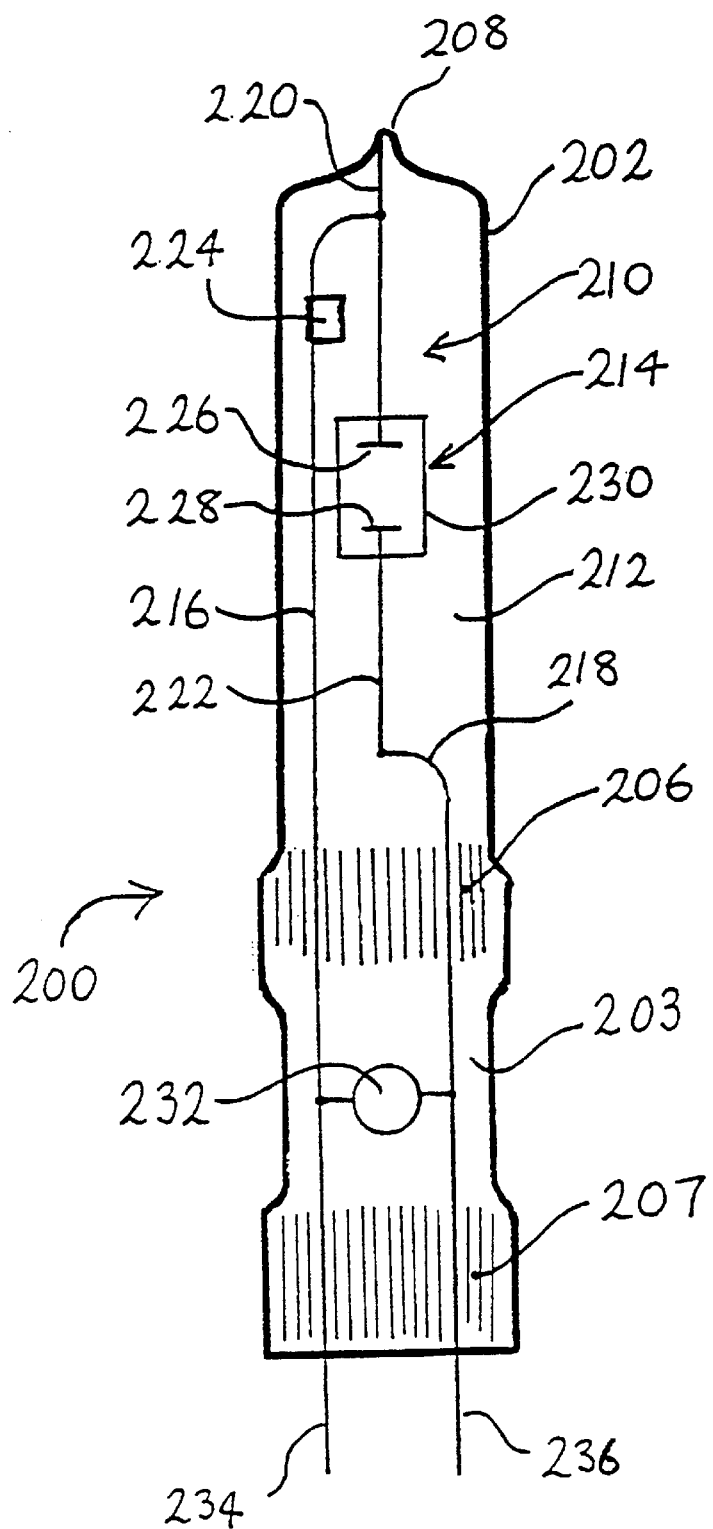
FIG. 7 is a partly sectioned side view of a lamp according to a third embodiment of the invention.

FIG. 7 shows a lamp 200 according to a still further embodiment of the invention where the lamp comprises an envelope 202 which allows the transmission of visible light and may be made of a tubular section of a hard glass material. The lamp also comprises a second pinch region which with a pinch region 206 of the envelope 202 forms a cooler enclosure 203. The pinch region is formed by flattening the tubular envelope during manufacture of the lamp, while the envelope is sufficiently hot for the envelope to be permanently sealed at the pinch region 206 and 207. At the other end of the envelope 202, it has also be sealed at the twist region 208, so the envelope forms a sealed enclosure for lamp elements 210, comprising an inert gas 212, a burner 214, leadout wires 216 and 218, support wires 220 and 222, and a getter 224. The burner 214 is supported by the support wire 220 and the support wire 222, which also make the electrical connections to the electrodes 226 and 228 which form end caps on the arc tube 230. Connected across the leadout wires 216 and 218 is a lamp capacitance 232. Leadout wires 216 and 218 are electrically connected to lamp pins 234 and 236 mounted in a second pinch region 207. The cooler enclosure 203 between pinch regions 206 and 207 of the lamp contains a lamp capacitance 232 which is electrically connected to leadout wires 216 and 218 and hence to lamp pins 234 and 236. The lamp pins provide means for connecting the lamp electrically to a socket (not shown) and hence to an electrical supply from a control.

In a further embodiment of the invention which is not shown, a lamp similar to that shown in FIG. 6 is has a robust burner supported on robust leadout wires and without an envelope. A lamp capacitance may be mounted to such a lamp in a similar manner to the lamp capacitance shown in FIG. 6.

Figure 9:
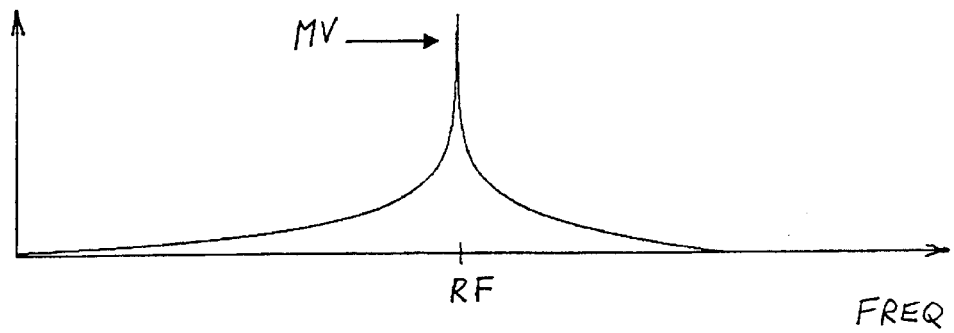
FIG. 9 is a graph of variation of a voltage across a lamp with a changing frequency of the voltage across the lamp of the embodiment shown in any one of FIGS. 3 to 5.

From FIG. 9 a preferred relationship between a voltage across a lamp (such as across terminals 49 and 50 in FIG. 4) and a frequency of a supply voltage across the lamp may be seen. In order to obtain the relationship shown, it is necessary to have all the reactances present in the joint control circuit but for the lamp to remain not lit. In FIG. 9 the vertical axis is the voltage across the lamp terminals LTV, and the horizontal axis is the frequency FREQ of the voltage supply across the lamp. From FIG. 9 it may be seen that at a particular frequency RF the joint control circuit is resonant and a high voltage MV is generated across the lamp. However, away from the particular frequency RF, the joint control circuit is not resonant, and the voltage LTV across the lamp terminals is much lower, and falls to substantially zero at a zero frequency when the supply is direct current. The lamp terminal voltage also falls to substantially zero when the frequency is very high, and exceeds a maximum operating frequency of the control. A benefit of a joint control circuit arranged to provide such a narrow voltage peak MV at the particular frequency RF is that it is only necessary for a combination of inductive and capacitive reactance in the joint control circuit to change by a small amount to prevent the joint control circuit being resonant at the particular frequency. A benefit of this is that such a change of a small amount may be obtained by using a lamp capacitance with a temperature dependant coefficient of capacitance, where the lamp capacitance is in thermal proximity to the lamp. Hence when a lamp is hot, the joint control circuit is preferably arranged not to be resonant at the particular frequency.

Figure 9A:
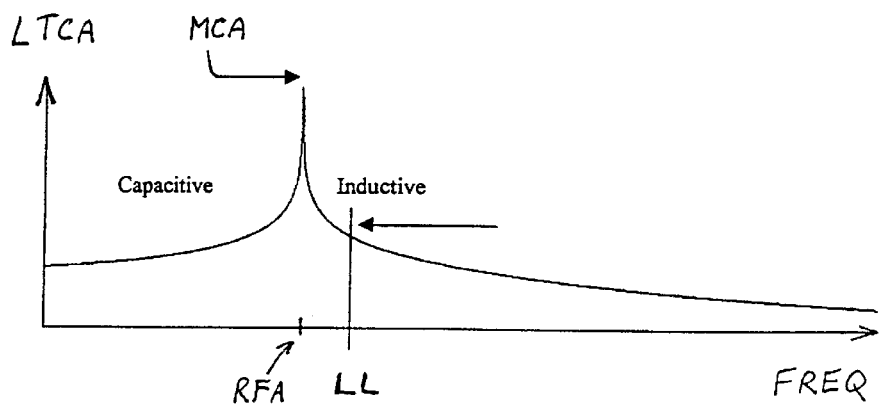
FIG. 9A is a graph of variation of a current through a lamp with a changing frequency of the voltage across the lamp of the embodiment shown in any one of FIGS. 3 to 5.

FIG. 9A shows a relationship between a theoretical current flow LTCA through a lamp and the variation with a frequency of a supply voltage across the lamp. Preferably a control is arranged so that the lamp is constrained to operate when lit at a point on the curve above a lower limit point LL. A benefit of this is that the current flow is then substantially proportional to the supply voltage across the lamp. Below the point LL, the lamp current changes rapidly around a resonant frequency RFA.

Figure 9B:
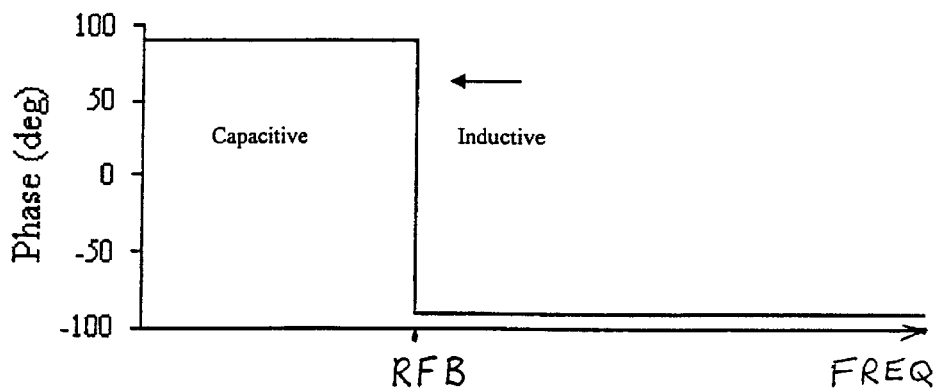
FIG. 9B is a graph of variation of a phase angle of a current through a lamp with a changing frequency of the voltage across the lamp of the embodiment shown in any one of FIGS. 3 to 5.

FIG. 9b shows how a phase angle measured between a current and a voltage in the control varies with frequency. It may be seen that the phase angle changes from leading to lagging at a resonant frequency RFB, when the capacitance and the inductance in the joint control circuit is supplied with electrical power at a resonant frequency of the combined capacitance and inductance.

Figure 10:
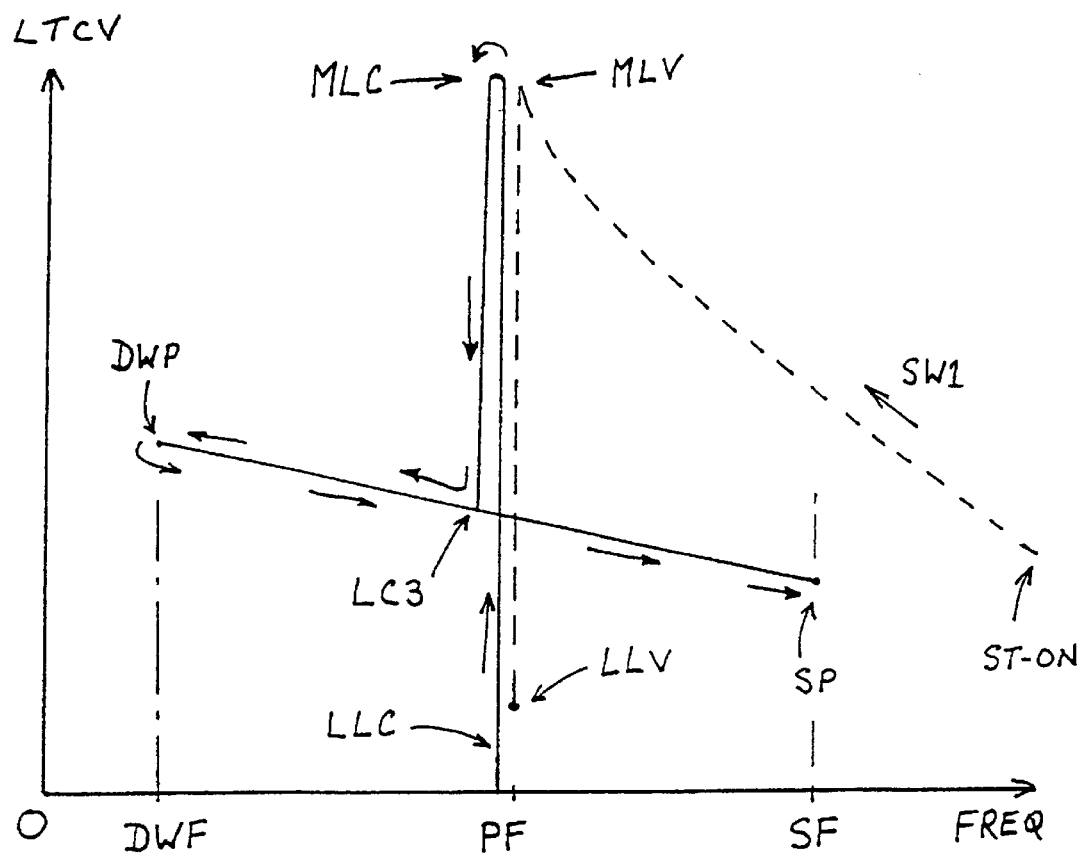
FIG. 10 is a graph of a variation of a voltage and a current through a lamp with a changing frequency of the voltage across the lamp when it is in operation of the embodiment shown in any one of FIGS. 3 to 5.

From FIG. 10, a combined graph of both voltage and current LTCV is plotted against frequency FREQ. Such a graph may be obtained from a circuit such as that shown in FIG. 3 or 4. Such a circuit may be arranged to comprise a variable frequency generator. In operation when the circuit of FIG. 3 or 4 is switched on the variable frequency generator may be preferably arranged so that it starts operation at a high frequency at a start point ST-ON. The variable frequency generator may be arranged to then reduce the frequency so that a voltage measured across terminals of a lamp follows the arrow SW1. The voltage rises to a maximum lamp voltage MLV at a particular frequency PF at which point the lamp resistance breaks down and the lamp suddenly begins to conduct. The voltage across the lamp immediately collapses from the maximum lamp voltage value MLV to a low value LLV. The voltage is no longer shown on this graph, as it now varies with time rather than with frequency. However, a lamp current LLC begins to flow through the lamp at the instant the lamp begins to conduct. Note that for clarity there is a gap shown on the graph. The lamp current rises substantially instantaneously to a maximum value MLC and then falls rapidly to a point LC3 as the variable frequency generator continues to reduce the frequency of the voltage across the lamp. As the frequency continues to fall the current rises to a second maximum at a dwell point DWP. Preferably the variable frequency generator is arranged to dwell for a considerably longer period than a sweep time that has elapsed between the start point ST-ON and the dwell point DWP. A benefit of the dwell period is that the discharge in the lamp is allowed to stabilise at the higher second maximum current before the variable frequency generator reduces the frequency to a sustained operation point SP. When the variable frequency generator is operating at the sustained operation point frequency SF the lamp is operating so as to produce light in an efficient manner.

In an embodiment of the invention, a joint control circuit preferably comprises a variable frequency generator as described above with reference to FIG. 10, and the joint control circuit is arranged to have the resonant characteristics described with reference to FIG. 9. The embodiment also comprising a lamp, having a lamp capacitance mounted in thermal proximity to the lamp; the lamp capacitance having a temperature dependant coefficient of impedance. During a period of normal lit operation the lamp will become hot and cannot be easily restarted until it has cooled to a sufficiently low temperature LT. An attempt to restart the lamp will be unsuccessful until the lamp has cooled to the sufficiently low temperature LT such that its starting voltage requirement has fallen within the capability of the control to provide a sufficient starting voltage. Since the lamp capacitance is in thermally proximity to the lamp the lamp capacitance temperature closely follows lamp temperature. The temperature coefficient of impedance will cause an impedance value of the lamp capacitance to vary with changing lamp temperature. Hence the joint control circuit may be arranged so that when the lamp is hot, the joint control circuit is not resonant at any frequency between a high frequency at a start point ST-ON and a low frequency at a dwell point DWP. Hence, the variable frequency generator will be unable to make the joint control circuit resonate with a hot lamp, and will not generate a high voltage intended for starting the lamp. A benefit of this arrangement is that the control may be prevented from making unsuccessful attempts to restart a hot lamp. These attempts would represent unnecessary electrical stress throughout the system. This thermally coupled arrangement overcomes a disadvantage of cost and complexity with known systems in which a timer is used to prevent the known systems from attempting to restart a hot lamp. A further advantage over the known timer systems is that such a thermally coupled arrangement may be inherently affected by the thermal properties of a mounting; so that an effect of the mounting on a time cooling to reach the sufficiently low temperature LT is accommodated.

It is known to provide an arrangement where the lamp is removable from a lampholder for replacement in an event of failure of the lamp. Known discharge lamps are available with more than one power rating, but utilising the same size lampholder. A hazard arising from such a known arrangement is that a user may accidentally insert a lamp of an incorrect power rating. For example a 35 watt lamp may be accidentally inserted into a socket that is intended for a 150 watt lamp. A result of this is that the 35 watt lamp is grossly over powered and will almost certainly fail explosively within a few minutes of start-up.

Figure 1:
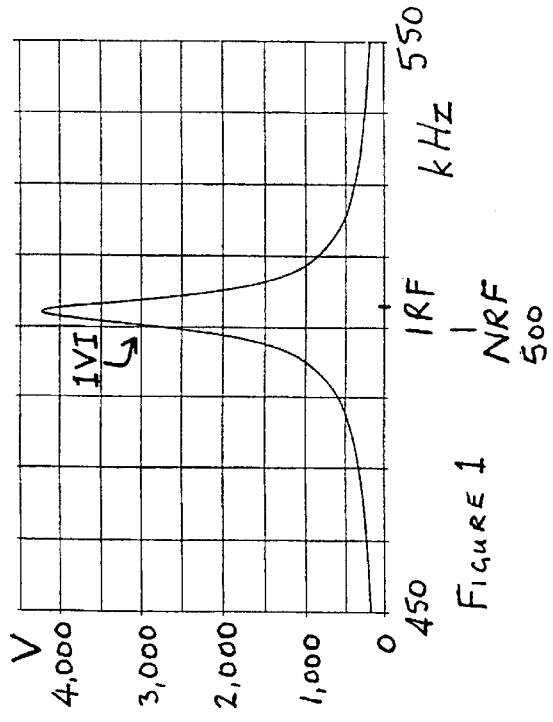
FIG. 1 is a graph of ignition voltage against frequency for a resonant condition when a 70 W lamp is connected in a lighting system intended for operating a 70 W lamp according to the invention.
Figure 2:
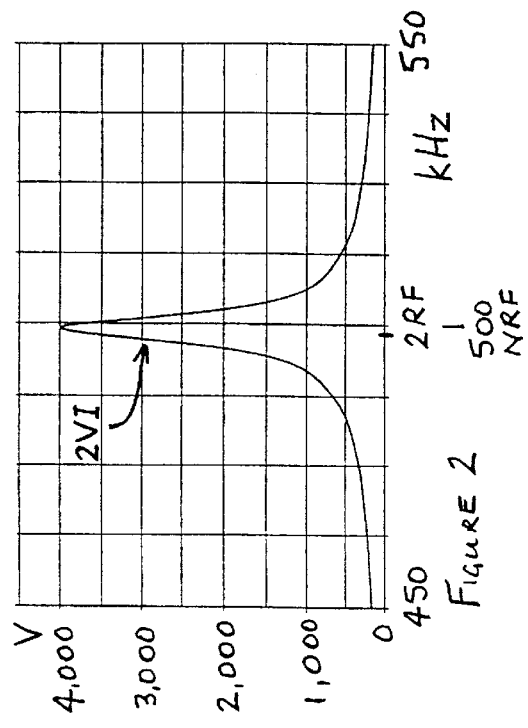
FIG. 2 is a graph of ignition voltage against frequency for a resonant condition when a 150 W lamp is connected in a lighting system intended for operating a 150 W lamp according to the invention.

The equation showing the relationship between frequency and the resonant components, the inductance and the capacitance of the joint control circuit is $F=1/2\pi\sqrt{LC}$. In an embodiment of the invention shown in any one of FIGS. 3, 4 or 5, a frequency generator is arranged to sweep a frequency as shown in FIGS. 1 and 2 from a high frequency HF to a low frequency LF such that LF is 10% below a nominal resonant frequency NRF which in FIGS. 1 and 2 is 500 kHz and HF is 10% above the resonant frequency NRF. By substitution in the above formula it will be seen that for the frequency sweep of +10% to −10% variation, the capacitor value may vary from 82.6% to 110% of a nominal value of capacitance that gives resonance at the resonant frequency LF. Hence, by causing the value of the joint capacitance to be outside of the range from 82.6% to 110% of the said nominal value of capacitance, resonance will be prevented. A benefit of the sweep range SR is that manufacturing tolerances on the values of capacitors and inductors do not prevent the production of a resonant voltage.

A benefit of this restriction in range of values for the frequency sweep together with appropriate selection of capacitance value associated with the lamp, the lighting system may be arranged so as to prevent ignition of lamps not intended to be associated with a particular control. As a consequence low power lamps may be prevented from being started when fitted to a higher power control.

In controls intended for higher power lamps the necessary value of series inductance will be lower than that in controls intended for lower power lamps. Accordingly higher power controls require a higher value of associated capacitance, and likewise a lower power control requires a lower value of associated capacitance to permit ignition resonance to occur at a particular resonant frequency. Thus a given wattage lamp may be associated with a specific value of capacitance such that lamp ignition will only be possible when the lamp is operated in conjunction with its intended control. This may be seen from FIGS. 1, 1A and 2 and 2A and Table 1 above.

From FIG. 1 which is a graph of ignition voltage 1VI against frequency for a resonant condition when a 70 W lamp is connected in a lighting system such as that shown in FIG. 4 intended for operating a 70 W lamp according to the invention. The voltage reaches a resonant peak at a resonant frequency 1RF. This voltage is arranged to be such that the lamp will normally start to conduct.

Figure 1A:
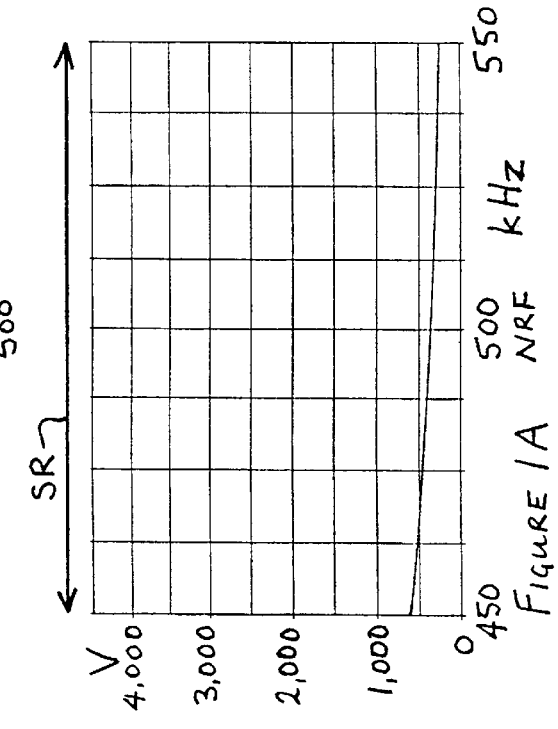
FIG. 1A is a graph of ignition voltage against frequency for a non-resonant condition when a 150 W lamp is connected in a lighting system intended for operating a 70 W lamp according to the invention.

FIG. 1A is a graph of ignition voltage 2VI against frequency for a non-resonant condition when a 150 W lamp is connected in a lighting system intended for operating a 70 W lamp according to the invention. It may be seen that the resonant peak voltage is not generated in this combination of lamp and control. Hence a hazard arising from the otherwise potentially dangerous combination is avoided.

FIG. 2 is a graph of ignition voltage against frequency for a resonant condition when a 150 W lamp is connected in a lighting system intended for operating a 150 W lamp according to the invention. The voltage reaches a resonant peak at a resonant frequency 2RF. This voltage is arranged to be such that the lamp will normally start to conduct.

Figure 2A:
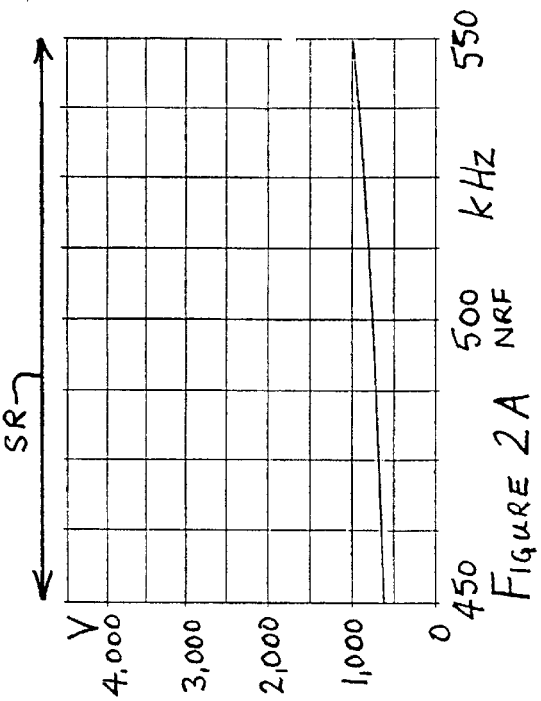
FIG. 2A is a graph of ignition voltage against frequency for a non-resonant condition when a 70 W lamp is connected in a lighting system intended for operating a 150 W lamp according to the invention.

FIG. 2A is a graph of ignition voltage against frequency for a non-resonant condition when a 70 W lamp is connected in a lighting system intended for operating a 150 W lamp according to the invention. It may be seen that the resonant peak voltage is not generated in this combination of lamp and control. Hence a hazard arising from the otherwise potentially dangerous combination is avoided.

In order to overcome this mismatching of lamps and sockets in a further embodiment of the invention, preferably a lamp capacitance is incorporated into the structure of a lamp. In this embodiment a fractional proportioning of values of reactance between a joint control circuit and the lamp capacitance may be made such as to prevent resonance occurring between a control intended for high power lamps and a low power lamp incorrectly inserted into a lampholder. In this way low power lamps will not start when connected to ballasts intended for operating high power lamps, since the electrical conditions required for resonance will not be met. By this means of matching lamp reactive parameters to ballast reactive parameters improved safety and reliability are achieved.

What is claimed is:

1. A lighting system comprising:
   (a) a high intensity discharge lamp, the high intensity discharge lamp comprising a sealed envelope containing at least two electrodes for an electrical discharge,
   (b) a holder for the lamp arranged so that the lamp can be replaced
   (c) an electronic control means for operating the lamp,
   (d) a joint operating circuit included in and between the control means and the lamp,
   (e) the control means having a variable frequency generator, the control means being so arranged to sweep over a pre-determined range of frequencies to produce by means of a resonant circuit a specific high frequency high voltage output for application to the joint operating circuit to ignite the lamp,
   (f) the resonant circuit comprising at least an inductance in the control means and a capacitance in the joint operating circuit,
   (g) said capacitance connected in parallel with a current path through the lamp,
   (h) said capacitance mounted at least partly to the lamp, and
   (i) said resonant circuit being adapted to resonate only in a presence of said lamp in said holder, a lamp capacitance being necessary to enable resonance in the resonant circuit.

2. A lighting system as claimed in claim 1 wherein the lamp capacitance is mounted in thermal proximity to the lamp.

3. A lighting system as claimed in claim 2 wherein the envelope is contained within an outer envelope.

4. A lighting system as claimed in claim 3 wherein the lamp capacitance is mounted within a part of the outer envelope.

5. A lighting system as claimed in claim 4 wherein the envelope has at least two sealed compartments, a first compartment containing the discharge lamp elements, and a second compartment containing the lamp capacitance.

6. A lighting system as claimed in claim 1 wherein the envelope is mounted to a cap.

7. A lighting system as claimed in claim 6 wherein the lamp capacitance is mounted within the cap.

8. A lighting system as claimed in claim 2 wherein the lamp capacitance has a temperature defendant coefficient of capacitance.

9. A lighting system as claimed in claim 8 wherein the temperature dependent coefficient of capacitance is negative.

10. A lighting system as claimed in claim 8 wherein the temperature dependant coefficient of capacitance is positive.

11. A lighting system as claimed in claim 8 wherein the value of capacitance and the temperature dependant coefficient of capacitance is arranged to prevent the joint control circuit from being resonant at the particular frequency when the lamp is hot.

12. A lighting system comprising:
    (a) a high intensity discharge lamp, the high intensity discharge lamp comprising a sealed envelope containing at least two electrodes for an electrical discharge,
    (b) a holder for the lamp arranged so that the lamp can be replaced
    (c) an electronic control means for operating the lamp,
    (d) a joint operating circuit included in and between the control means and the lamp,
    (e) the control means has a variable frequency generator the control means being so arranged to sweep over a pre-determined range of frequencies to produce by means of a resonant circuit a specific high frequency high voltage output for application of the joint operating circuit to ignite the lamp,
    (f) the resonant circuit comprising at least in inductance in the control means and a capacitance in the joint operating circuit,
    (g) said capacitance connected in parallel with a current path through the lamp,
    (h) said capacitance mounted at least partly to the lamp as a lamp capacitance,
    (i) said lamp capacitance having a value specific to the lamp, and
    (j) said resonant circuit being adapted to resonate only in a presence of said lamp in said holder, a specific value of a lamp capacitance being necessary to enable resonance in the resonant circuit.

13. A lighting system comprising:
    (a) a high intensity discharge lamp, the high intensity discharge lamp comprising a sealed envelope containing at least two electrodes for an electrical discharge,
    (b) a holder for the lamp arranged so that the lamp can be replaced
    (c) an electronic control means for operating the lamp,
    (d) a joint operating circuit included in and between the control means and the lamp,
    (e) the control means has a variable frequency generator, the control means being so arranged to sweep over a pre-determined range of frequencies to produce by means of a resonant circuit a specific high frequency high voltage output for application to the joint operating circuit to ignite the lamp,
    (f) the resonant circuit comprising at least an inductance in the control means and a capacitance in the joint operating circuit,
    (g) said capacitance connected in parallel with a current path through the lamp,
    (g) said capacitance mounted at least partly to the lamp, as a lamp capacitance, and in thermal proximity to the lamp,
    (i) the lamp capacitance having a value of lamp capacitance and a temperature dependent coefficient of impedance, and
    (j) said value of lamp capacitance and the value of the temperature dependent coefficient of impedance being arranged to prevent the joint control circuit from being resonant at the particular frequency when the lamp is hot, a particular lamp capacitance value being necessary to enable resonance in the resonant circuit.

* * * * *